US 9,994,143 B2

United States Patent
Ferigo et al.

(10) Patent No.: US 9,994,143 B2
(45) Date of Patent: Jun. 12, 2018

(54) AUTOMOTIVE LIGHTING

(71) Applicant: Automotive Lighting Italia S.p.A., Venaria Reale (IT)

(72) Inventors: Domenico Ferigo, Tolmezzo (IT); Sara Paroni, Codroipo (IT)

(73) Assignee: Automotive Lighting Italia S.p.A., Venaria Reale (IT)

(*) Notice: Subject to any disclaimer, the term of this patent is extended or adjusted under 35 U.S.C. 154(b) by 44 days.

(21) Appl. No.: 15/137,230

(22) Filed: Apr. 25, 2016

(65) Prior Publication Data
US 2016/0311363 A1 Oct. 27, 2016

(30) Foreign Application Priority Data

Apr. 23, 2015 (IT) .............................. TV2015A0058

(51) Int. Cl.
*F21V 9/00* (2018.01)
*B60Q 1/22* (2006.01)
(Continued)

(52) U.S. Cl.
CPC .............. *B60Q 1/22* (2013.01); *F21S 43/14* (2018.01); *F21S 43/145* (2018.01); *F21S 43/195* (2018.01); *F21S 43/241* (2018.01); *F21S 43/243* (2018.01); *F21S 43/249* (2018.01); *F21S 43/26* (2018.01); *F21S 43/27* (2018.01);
(Continued)

(58) Field of Classification Search
CPC ... B60Q 1/02; B60Q 1/22; B60Q 1/24; B60Q 1/26; B60Q 1/2603; B60Q 1/30; B60Q 3/60; F21S 48/20–48/2212; F21S 48/23; F21S 48/24; F21S 48/1241;
(Continued)

(56) References Cited

U.S. PATENT DOCUMENTS

2012/0033441 A1   2/2012  Sousek et al.
2012/0294024 A1*  11/2012 Peck .................... F21S 48/1159
                                              362/516
2014/0321139 A1*  10/2014 Bungenstock .......... F21S 48/00
                                              362/511

FOREIGN PATENT DOCUMENTS

EP   2012056   1/2009
EP   2479486   7/2012

OTHER PUBLICATIONS

Italian Search Report and Written Opinion for Italian Application No. IT TV2015A000058 dated Jan. 6, 2016.

* cited by examiner

*Primary Examiner* — Paultep Savusdiphol
(74) *Attorney, Agent, or Firm* — McCarter & English, LLP

(57) ABSTRACT

An automotive light including: a rear casing, which is substantially basin-shaped and is structured in such a way as to be fixed on the vehicle body; a front half-shell, which is arranged to close the mouth of the rear casing and is provided with at least a transparent or semitransparent portion; and at least one lighting assembly, in turn including a platelike light-guide body, which extends within the rear casing in such a way as to place a front sidewall thereof so that it faces the transparent or semitransparent portion of the front half-shell and a rear sidewall thereof so that it faces the bottom of the rear casing; and a light-emitting device, which is located within a transverse slot that extends within the platelike light-guide body, from the rear sidewall to the front sidewall, remaining substantially perpendicular to the midplane of the platelike light-guide body and substantially parallel to the optical axis of the automotive light.

17 Claims, 3 Drawing Sheets

(51) Int. Cl.
  *G02B 6/00* (2006.01)
  *F21Y 107/90* (2016.01)
  *F21Y 101/00* (2016.01)

(52) U.S. Cl.
  CPC ............. *F21S 43/315* (2018.01); *F21S 43/40* (2018.01); *G02B 6/00* (2013.01); *F21Y 2101/00* (2013.01); *F21Y 2107/90* (2016.08)

(58) Field of Classification Search
  CPC ............... F21S 48/1335; F21S 48/2225; F21S 48/2243; F21S 48/225; F21S 48/2256
  USPC .................. 362/487, 509, 511, 516–522, 545
  See application file for complete search history.

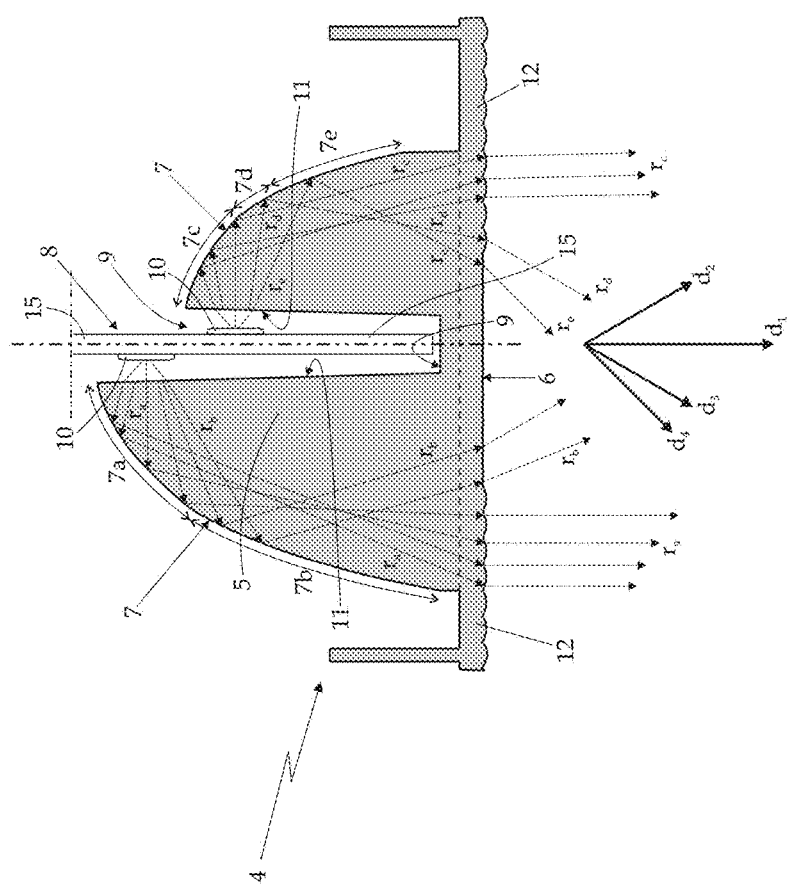

ately recessed in a compartment purposely provided in the rear part of the vehicle body; a front half-shell, which is placed in order to close the mouth of the rear casing in such a way that it surfaces on the outside of the vehicle body, and is provided with a series of transparent or semitransparent lenticular portions, usually having colours different from one another; and a series of lighting assemblies, which are positioned within the rear casing, each immediately underneath a respective transparent or semitransparent lenticular portion of the front half-shell in such a way as to be able to backlight said transparent or semitransparent lenticular portion of the half-shell.

AUTOMOTIVE LIGHTING

BACKGROUND

1. Technical Field

The present invention relates to an automotive light. In greater detail, the present invention regards a rear light for motor vehicles provided with a reverse light, a use to which the ensuing treatment will make explicit reference, without this implying any loss of generality.

2. Background Art

As is known, rear lights for motor vehicles generally comprise: a substantially basin-shaped rear casing, which is structured in such a way as to be stably recessed in a compartment purposely provided in the rear part of the vehicle body; a front half-shell, which is placed in order to close the mouth of the rear casing in such a way that it surfaces on the outside of the vehicle body, and is provided with a series of transparent or semitransparent lenticular portions, usually having colours different from one another; and a series of lighting assemblies, which are positioned within the rear casing, each immediately underneath a respective transparent or semitransparent lenticular portion of the front half-shell in such a way as to be able to backlight said transparent or semitransparent lenticular portion of the half-shell.

In greater detail, each lighting assembly is associated to a specific light signal and is structured in such a way as to generate a light beam that, after it has traversed the front half-shell, meets the specifications of type approval regarding colour, intensity, and spatial distribution of the light emitted.

In the case of the reverse light, the specifications of type approval establish that the lighting assembly must be able to emit a light beam provided with a first component parallel to the longitudinal axis of the vehicle, a second component inclined by 30° towards the outside of the motor vehicle, a third component inclined by 45° towards the outside of the motor vehicle, and finally a fourth component inclined by 30° towards the vertical midplane of the motor vehicle. Optionally, the light beam may also have a fifth component inclined by 45° towards the vertical midplane of the motor vehicle.

In addition, the component of the light beam directed parallel to the longitudinal axis of the vehicle must have an intensity of not less than the summation of the intensities detected parallel to the other three or four directions referred to above.

In the latest automotive lights, the lighting assembly that generates the reverse light is formed by a horizontal row of LEDs placed at appropriate distances apart from one another, and by a series of reflectors with semiparabolic profile that are interspersed with the LEDs, each up against a respective LED, and are oriented in such a way as to reflect and collimate the light emitted by said LED towards the facing transparent or semitransparent lenticular portion of the front half-shell in a pre-set direction.

Each reflector is hence associated to a respective LED in such a way as to reflect and collimate the light emitted by said LED towards the facing transparent or semitransparent lenticular portion of the front half-shell in a pre-set direction.

The arrangement of the LEDs and the orientation of the respective reflectors are chosen in such a way as to generate a light beam that is able to meet the specifications of type approval envisaged for reverse lights.

In other words, a first set of reflectors is oriented in such a way as to reflect and collimate the light in a first direction parallel to the longitudinal axis of the vehicle; a second set of reflectors is oriented in such a way as to reflect and collimate the light in a direction inclined by 30° towards the outside of the vehicle; a third set of reflectors is oriented in such a way as to reflect and collimate the light in a direction inclined by 45° towards the outside of the vehicle; and finally a fourth set of reflectors is oriented in such a way as to reflect and collimate the light in a direction inclined by 30° towards the vertical midplane of the vehicle.

Even though the lighting assembly described above works excellently, it has a relatively complex structure, which significantly affects the overall costs of production of the automotive light.

Each LED, in fact, is individually fixed on a small support and power-supply board that incorporates the electronic circuits for power-supply and control of the LED, with the problems of assembly that derive therefrom. The metallization of the reflectors, moreover, is an industrial process that is relatively long and is affected by a high degree of defectiveness.

SUMMARY OF THE INVENTION

The aim of the present invention is to provide a rear light for motor vehicles with reverse light that will be more economically advantageous to produce than the ones currently on the market.

In accordance with the above purposes, according to the present invention an automotive light that generally include:
- a rear casing (2), which is substantially basin-shaped and is structured in such a way as to be fixed on the vehicle body;
- a front half-shell (3), which is placed in order to close the mouth of the rear casing (2) and is provided with at least a transparent or semitransparent portion (3a); and
- at least one lighting assembly (4), which emits light upon command and is located within the rear casing (2) in such a way as to be able to backlight said transparent or semitransparent portion (3a) of the front half-shell (3);
- the lighting assembly (4) in turn including a platelike light-guide body (5), which extends within the rear casing (2) in such a way as to arrange a front sidewall (6) thereof so that it faces the transparent or semitransparent portion (3a) of the front half-shell (3), and a rear sidewall (7) thereof so that it faces the bottom of the rear casing (2); and
- a light-emitting device (8), which is located inside the rear casing (2) and is structured so as to direct the light produced within the platelike light-guide body (5), in such a way that the light can reach, and exit from, the front sidewall (6);
- the automotive light (1) being further characterized in that the rear sidewall (7) of the platelike light-guide body (5) has a curved profile having a substantially parabolic shape, with the concavity facing the front sidewall (6), and is provided with a transverse slot (9), which extends within the platelike light-guide body (5), from the rear sidewall (7) to the front sidewall (6), remaining substantially perpendicular to the midplane of the platelike light-guide body (5) and substantially parallel to an optical axis (A) of the automotive light in such a way as to divide the rear sidewall (7) into two semiparabolic portions (7a, 7b; 7c, 7d, 7e), each of which follows a specific curved profile with complex parabolic geometry;

in that the light-emitting device (8) engages the transverse slot (9) and is provided with two light sources (10), which are positioned within the transverse slot (9), each directly facing a respective inner sidewall (11) of the platelike light-guide body (5) in such a way as to direct the light produced within the platelike light-guide body (5) towards a corresponding semiparabolic portion (7a, 7b; 7c, 7d, 7e) of the rear sidewall (7); and in that at least one of the two semiparabolic portions (7a, 7b; 7c, 7d, 7e) of the rear sidewall (7) is shaped in such a way as to direct the light rays coming from the light source (10) towards the front sidewall (6) in such a way that the light rays exiting from the front sidewall (6) are collimated in a first direction ($d_1$) substantially parallel to said optical axis (A) of the automotive light, and also at least in a second direction ($d_2$, $d_3$) inclined with respect to the optical axis (A) of the automotive light by a first pre-set angle is provided as defined in claim 1 and preferably, though not necessarily, in any one of the claims depending thereon.

Additional advantageous features, functions and benefits of the present disclosure will be apparent from the detailed description which follows, particularly when read in conjunction with the accompanying figures.

BRIEF DESCRIPTION OF THE DRAWINGS

The present invention will now be described with reference to the annexed drawings, which illustrate a non-limiting example of embodiment thereof and in which:

FIG. 4 is a cross-sectional view of the lighting assembly illustrated in FIG. 3.

DETAILED DESCRIPTION OF THE INVENTION

Figure 1:
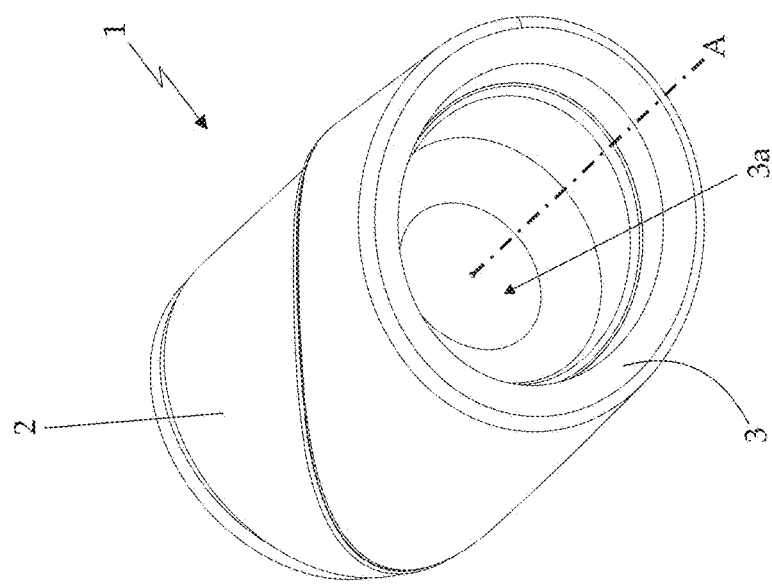
FIG. 1 is a perspective view of an automotive rear light provided according to the teachings of the present invention, with parts shown in cross-sectional view and parts removed for clarity.
Figure 2:
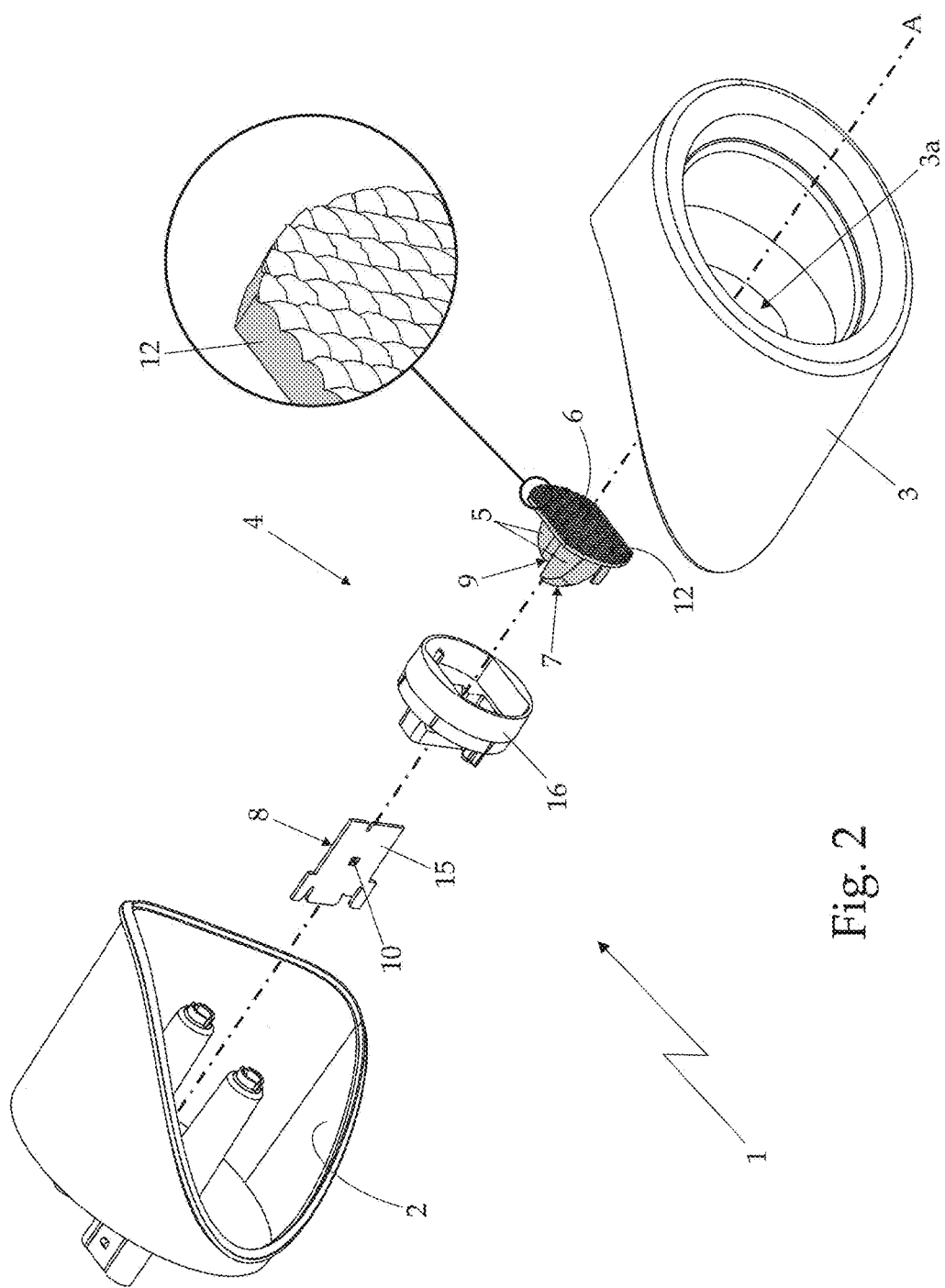
FIG. 2 is an exploded perspective view of the automotive light illustrated in FIG. 1.

With reference to FIGS. 1 and 2, designated as a whole by the number 1 is an automotive light particularly suited for being fixed on the rear part of the body of a car, van, lorry, motorcycle or the like, i.e., an automotive rear light.

In greater detail, the automotive light 1 is preferably structured in such a way as to be recessed in the rear part of the body of a car, motorcycle, or similar vehicle, and basically comprises:

a rigid rear body 2 preferably made of plastic material, which is substantially basin-shaped and is preferably structured in such a way as to be at least partially recessed in a compartment purposely made of the rear part of the vehicle body (not illustrated);

a front half-shell 3 preferably made of plastic material, which is placed in order to close the mouth of the rear body 2, preferably in such a way as to be able to surface at the same time on the outside of the vehicle body (not illustrated), and is provided with one or more transparent or semi-transparent portions, which may optionally also be coloured; and one or more lighting assemblies, each of which emits light upon command and is located within the rear body 2 in a position such as to be able to backlight a corresponding transparent or semi-transparent portion of the front half-shell 3.

In other words, the automotive light 1 is provided with one or more electrically operated lighting assemblies, each of which is located underneath the front half-shell 3, directly facing a corresponding transparent or semitransparent portion of the front half-shell 3, and is structured in such a way as to be able to direct a light beam on the outside of the automotive light 1 through the transparent or semitransparent portion itself of the front half-shell 3.

In greater detail, the front half-shell 3 is provided with at least a transparent or semitransparent lenticular portion 3a, which placed positioned on the front half-shell 3 in such a way as to be arranged facing/aligned to the rear part of the vehicle when the automotive light 1 is mounted on the vehicle body.

The lighting assembly, hereinafter designated by the reference number 4, that is designed to backlight the transparent or semitransparent portion 3a of the front half-shell 3 is positioned within the rear casing 2, immediately underneath the transparent or semitransparent portion 3a, and is structured in such a way as to be able to generate and direct, towards the transparent or semitransparent portion 3a, a light beam that, exiting from the front half-shell 3, has a majority component of the light rays directed parallel to the optical reference axis A of the automotive light. Said optical axis is locally substantially parallel to the longitudinal axis of the vehicle (not illustrated) when the automotive light 1 is mounted on the vehicle body.

Preferably, the transparent or semitransparent portion 3a is moreover positioned on the front half-shell 3 in such a way as to be locally substantially perpendicular to the optical axis A of the automotive light.

With reference to FIGS. 1 and 2, in the example illustrated, in particular, the transparent or semitransparent portion 3a of the front half-shell 3 is preferably substantially perpendicular to the optical axis A of the automotive light, and preferably has a substantially circular shape.

In greater detail, in the example illustrated, the front half-shell 3 is preferably obtained via an injection-moulding process, and at least the transparent or semitransparent lenticular portion 3a is preferably made of transparent or semitransparent polycarbonate or polymethylmethacrylate.

The rear casing 2 is, instead, preferably made entirely of opaque plastic material, also in this case preferably using an injection-moulding process.

Obviously, in a different embodiment, the rear casing 2 could also be structured in such a way as to be simply fixed in cantilever fashion on the rear part of the vehicle body (not illustrated).

Figure 3:
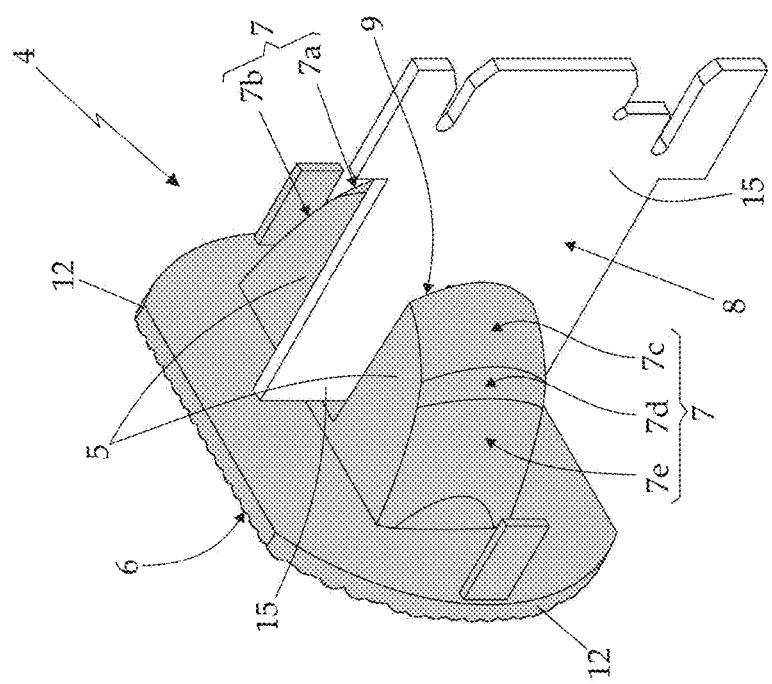
FIG. 3 is a perspective view of a lighting assembly of the automotive light illustrated in FIGS. 1 and 2.

With reference to FIGS. 2, 3, and 4, the lighting assembly 4, instead, basically comprises: a platelike light-guide body 5 made of photoconductive material, which extends within the rear casing 2 remaining locally substantially parallel to the optical axis A of the automotive light in such a way as to set a front sidewall 6 thereof so that it faces the transparent or semitransparent portion 3a of the front half-shell 3 and a rear sidewall 7 thereof, opposite to the front sidewall 6, so that it faces the bottom of the rear casing 2; and a light-emitting device 8, which emits light upon command and is positioned within the rear casing 2, behind the platelike light-guide body 5, in such a way as to direct the emitted light into the platelike light-guide body 5. Said light then propagates within the platelike light-guide body 5, according to the same physical principles that regulate propagation of light within optical-fibre cables, until it reaches the front sidewall 6, which in turn is structured in such a way as to cause the light to come out freely from the platelike light-guide body 5 in the direction of the front half-shell 3.

In greater detail, the front sidewall 6 of the platelike light-guide body 5 is preferably oriented in such a way as to be substantially perpendicular to the optical axis A of the automotive light, and preferably also substantially horizontal when the automotive light 1 is mounted on the vehicle body.

Preferably, the platelike light-guide body 5 is moreover arranged within the rear casing 2 in such a way that its midplane is substantially horizontal when the automotive light 1 is mounted on the vehicle body.

The rear sidewall 7 of the platelike light-guide body 5, instead, has a curved profile having a substantially parabolic shape, with the concavity facing the front sidewall 6, and is moreover provided with a rectilinear transverse slot 9, which is preferably located roughly at the centre of the rear sidewall 7 and extends in the platelike light-guide body 5 from the rear sidewall 7 to the front sidewall 6, remaining substantially perpendicular to the midplane of the platelike light-guide body 5 (in FIG. 4 the midplane is parallel to the plane of the sheet) and substantially parallel to the optical axis A of the automotive light, in such a way as to divide the rear sidewall 7 into two semiparabolic portions, each of which follows a specific curved profile with complex parabolic geometry.

The two opposite sidewalls of the platelike light-guide body 5 that flank and delimit the transverse slot 9, hereinafter referred to as inner sidewalls of the platelike light-guide body 5, are moreover preferably locally substantially parallel to the optical axis A of the automotive light.

With reference to FIGS. 2, 3, and 4, the light-emitting device 8 engages the transverse slot 9 and is provided with two electrically supplied light sources 10, which are positioned within the transverse slot 9, i.e., between the two inner sidewalls 11 of the platelike light-guide body 5, each directly facing a respective inner sidewall 11 of the platelike light-guide body 5, in such a way as to direct the light produced directly into the platelike light-guide body 5 through the inner sidewall 11 itself.

In greater detail, each light source 10 is preferably located astride of the midplane of the platelike light-guide body 5 and is oriented in such a way as to direct the light produced directly into the platelike light-guide body 5 towards the facing semiparabolic portion of the rear sidewall 7 in such a way that said light will propagate in the platelike light-guide body 5 as far as the rear sidewall 7, where it is preferably reflected by total reflection/refraction (total inner reflection) towards the front sidewall 6, whence it exits from the platelike light-guide body 5 in the direction of the front half-shell 3.

With reference to FIGS. 2, 3, and 4, preferably the light-emitting device 8 moreover has a substantially platelike structure and extends into the transverse slot 9, remaining locally substantially perpendicular to the midplane to the platelike light-guide body 5 and substantially parallel to the optical axis A of the automotive light, and preferably also locally substantially parallel to the two inner sides 11 of the platelike light-guide body 5 that delimit the transverse slot 9.

In addition, the light-emitting device 8 is provided with two light sources 10, which are positioned on opposite sides of the device, within the transverse slot 9, in such a way that each directly faces a respective inner sidewall 11 of the platelike light-guide body 5.

With reference to FIG. 4, a first semiparabolic portion of the rear sidewall 7 of the platelike light-guide body 5 has a curved profile with complex parabolic geometry, which is appropriately shaped to be able to reflect/direct the light rays coming from the light source 10 towards the front sidewall 6 in such a way that the light rays exiting from the front sidewall 6 are collimated in a first direction $d_1$ locally substantially parallel to the optical axis A of the automotive light and also in a second direction $d_2$ inclined with respect to the optical axis A of the automotive light by a pre-set angle the value of which is preferably comprised between +20° and +40°.

In the example illustrated, in particular, the second direction $d_2$ is preferably inclined with respect to the optical axis A of the automotive light by an angle of approximately +30°.

The second semiparabolic portion of the rear sidewall 7 of the platelike light-guide body 5 has, instead, a curved profile with complex parabolic geometry, which is appropriately shaped so as to be able to reflect the light rays coming from the light source 10 towards the front sidewall 6 in such a way that the light rays exiting from the front sidewall 6 are collimated in the first direction $d_1$, which is locally substantially parallel to the optical axis A of the automotive light, and also in a third direction $d_3$, which is inclined with respect to the optical axis A of the automotive light by a pre-set angle, the value of which is preferably comprised between 20° and 40°, and preferably also in a fourth direction $d_4$, which is inclined with respect to the optical axis A of the automotive light by a pre-set angle, the value of which is preferably comprised between 40° and 50°.

In the example illustrated, in particular, the third direction $d_3$ is preferably inclined with respect to the optical axis A of the automotive light by an angle of approximately 30°, whereas the fourth direction $d_4$ is preferably inclined with respect to the optical axis A of the automotive light by an angle of approximately 45°.

With reference to FIG. 4, in the example illustrated, in particular, the first semiparabolic portion of the rear sidewall 7 of the platelike light-guide body 5 comprises, in succession, starting from the transverse slot 9:

a first curved portion 7a with parabolic geometry, which is shaped in such a way as to reflect the light rays $r_a$ coming from the facing light source 10 towards the front sidewall 6 of the platelike light-guide body 5 with an angle of incidence such that said light rays $r_a$ exit from the front sidewall 6 collimated substantially parallel to the direction $d_1$; and also a second curved portion 7b with parabolic geometry, which is shaped in such a way as to reflect the light rays $r_b$ coming from the facing light source 10 towards the front sidewall 6 of the platelike light-guide body 5 with an angle of incidence such that said light rays $r_b$ exit from the front sidewall 6 collimated substantially parallel to the direction $d_2$.

In greater detail, the front sidewall 6 of the platelike light-guide body 5 can ideally be divided longitudinally into a central segment, locally aligned to the transverse slot 9, and into two lateral segments, which are located on opposite sides of the central segment, each aligned to/facing a respective semiparabolic portion of the rear sidewall 7 of the platelike light-guide body 5.

The curved portion 7a of the first semiparabolic portion of the rear sidewall 7 is preferably structured in such a way as to reflect the light rays $r_a$ coming from the light source 10 towards the facing lateral segment of the front sidewall 6, whereas the curved portion 7b of the first semiparabolic portion of the rear sidewall 7 is preferably structured in such a way as to reflect the light rays $r_b$ coming from the light source 10 towards the central segment of the front sidewall 6 of the platelike light-guide body 5.

With reference to FIGS. 3 and 4, instead, the second semiparabolic portion of the rear sidewall 7 of the platelike light-guide body 5 comprises, in succession starting from the transverse slot 9:

a first curved portion 7c with parabolic geometry, which is shaped in such a way as to reflect the light rays $r_c$ coming from the facing light source 10 towards the front sidewall 6 of the platelike light-guide body 5 with an angle of incidence such that said light rays $r_c$ exit from the front sidewall 6 collimated substantially parallel to the direction $d_1$;

a second curved portion 7d with parabolic geometry, which is shaped in such a way as to reflect the light rays $r_d$ coming from the facing light source 10 towards the front sidewall 6 of the platelike light-guide body 5 with an angle of incidence such that said light rays $r_d$ exit from the front sidewall 6 collimated substantially parallel to the direction $d_3$; and preferably also a third curved portion 7e with parabolic geometry, which is shaped in such a way as to reflect the light rays $r_e$ coming from the facing light source 10 towards the front sidewall 6 of the platelike light-guide body 5 with an angle of incidence such that said light rays $r_e$ exit from the front sidewall 6 collimated substantially parallel to the direction $d_4$.

In greater detail, the curved portion 7c of the second semiparabolic portion of the rear sidewall 7 is preferably structured in such a way as to reflect the light rays $r_c$ coming from the light source 10 towards the facing lateral segment of the front sidewall 6, whereas the curved portions 7d and 7e of the second semiparabolic portion of the rear sidewall 7 are preferably structured in such a way as to reflect the light rays $r_d$ and $r_e$ coming from the corresponding light source 10 towards the central segment of the front sidewall 6 of the platelike light-guide body 5.

Preferably, at output from the central segment of the front sidewall 6 of the platelike light-guide body 5, the light rays $r_d$ and $r_e$ coming from the second semiparabolic portion of the rear sidewall 7 cross the light rays $r_b$ coming from the first semiparabolic portion of the rear sidewall 7.

With reference to FIGS. 2, 3, and 4, preferably the front sidewall 6 of the platelike light-guide body 5 is moreover structured in such a way as to be able to scatter the light rays $r_a$, $r_b$, $r_c$, $r_d$, $r_e$ exiting from the platelike light-guide body 5.

In greater detail, in the example illustrated, the platelike light-guide body 5 preferably has, at the front sidewall 6, a platelike head 12, which extends in cantilever fashion perpendicular to the midplane of the platelike light-guide body 5, in such a way as to be substantially perpendicular to the optical axis A of the automotive light and preferably also locally substantially parallel to the transparent or semitransparent portion 3a of the front half-shell 3, and is structured in such a way as to scatter the light rays $r_a$, $r_b$, $r_c$, $r_d$, $r_e$ exiting from the front sidewall 6.

In the example illustrated, in particular, the light-scattering head 12 has a disk shape substantially complementary to that of the transparent or semitransparent portion 3a of the front half-shell 3 and preferably has a divergent optics preferably with cylindrical or pillow geometry, which extends throughout the face or through part of the face of the platelike head 12 facing the front half-shell 3.

Finally, the platelike light-guide body 5 is preferably made of polycarbonate, polymethylmethacrylate, or some other transparent plastic material, preferably using an injection-moulding process.

With reference to FIGS. 2, 3, and 4, preferably at least one and preferably both of the light sources 10 of the light-emitting device 8 comprise at least one LED (Light-Emitting Diode) 10 or one OLED (Organic Light-Emitting Diode).

In greater detail, in the example illustrated, the platelike light-emitting device 8 preferably comprises: a platelike support board 15, which extends perpendicular to the midplane of the platelike light-guide body 5 and engages, in a through way, the transverse slot 9; and two LEDs or OLEDs 10 positioned on the two major faces of the support board 15, each facing a respective inner sidewall 11 of the platelike light-guide body 5. Preferably, the support board 15 moreover incorporates also the circuits for power-supply and control of the diodes.

In addition, the two LEDs or OLEDs 10 are preferably positioned on the support board 15 in such a way as to be arranged astride of the midplane of the platelike light-guide body 5 and are staggered with respect to one another parallel to the midplane of the platelike light-guide body 5 in such a way as to optimize dissipation of the heat produced during the operation.

With reference to FIG. 2, finally the lighting assembly 4 preferably also comprises a protective cup-shaped body 16 preferably made of opaque plastic material, which is sized so as to be able to receive inside it both the platelike light-guide body 5 and the platelike light-emitting device 8, allowing only the front sidewall 6 of the platelike light-guide body 5, i.e., the platelike light-scattering head 12, to surface.

General operation of the automotive light 1 can be readily deduced from what has been written above and does hence not require further explanation, except to point out that the lighting assembly 4 is able to produce a light beam that satisfies the type-approval specifications envisaged by reverse lights.

The advantages linked to the particular structure of the lighting assembly 4 are considerable.

The lighting assembly 4 has an extremely compact structure, and hence enables a significant reduction of the overall dimensions of the automotive light 1.

The lighting assembly 4 moreover has a structure that is relatively simple and economically advantageous to produce, hence enabling reduction of the overall costs of production of the automotive light 1.

Finally, it is clear that modifications and variations may be made to the automotive light 1 described above, without thereby departing from the scope of the present invention.

For example, like the second semiparabolic portion of the rear sidewall 7, the first semiparabolic portion of the rear sidewall 7 of the platelike light-guide body 5 could comprise three consecutive portions with parabolic geometry.

In this case, the first semiparabolic portion of the rear sidewall 7 of the platelike light-guide body 5 would be able to reflect/direct the light rays coming from the light source 10 towards the front sidewall 6 in such a way that the light rays exiting from the front sidewall 6 are collimated, not only in the directions $d_1$ and $d_2$, but also in a further fifth direction inclined with respect to the optical axis A of the automotive light by a pre-set angle, the value of which is preferably comprised between +40° and +50°, and preferably, though not necessarily, approximately +45°.

In addition, in a more sophisticated embodiment, which is not illustrated, the platelike light-emitting device 8 may be provided with a single platelike OLED, which is positioned within the transverse slot 9, substantially perpendicular to the midplane of the platelike light-guide body 5, in such a way as to face simultaneously both of the inner sidewalls 11 of the platelike light-guide body 5 and to be able to light up simultaneously said inner sidewalls 11.

In addition, in a second embodiment, which is not illustrated either, the light-scattering head 12 can be replaced by a platelike body made of transparent or semitransparent material, completely separated from the platelike light-guide body 5, which extends in a direction perpendicular to the midplane of the platelike light-guide body 5 and is positioned so that it bears upon, or in any case is in front of, the front sidewall 6 of the platelike light-guide body 5, preferably in such a way as to be substantially perpendicular to the optical axis A of the automotive light and/or locally substantially parallel to the transparent or semitransparent portion 3a of the front half-shell 3, in such a way as to be traversed by the light beam exiting from the platelike light-guide body 5.

Finally, in a third embodiment not illustrated, instead of having a curved profile with complex parabolic geometry, the first and/or second semiparabolic portions of the rear sidewall 7 follow/follows a specific curved profile with complex geometry that develops according to a polyline, in which each rectilinear segment of the polyline is oriented in such a way as to reflect by total refraction the light rays r towards the front sidewall 6 of the platelike light-guide body 5 in the respective direction $d_1$, $d_2$, $d_3$, or $d_4$.

Although the present invention has been described with reference to exemplary embodiments thereof, the present invention is not limited by or to such exemplary embodiments.

The invention claimed is:

1. An automotive light (1) comprising: a rear casing (2), which is substantially basin-shaped and is structured in such a way as to be fixed on the vehicle body; a front half-shell (3), which is placed in order to close the mouth of the rear casing (2) and is provided with at least a transparent or semitransparent portion (3a); and at least one lighting assembly (4), which emits light upon command and is located within the rear casing (2) in such a way as to be able to backlight said transparent or semitransparent portion (3a) of the front half-shell (3);

said lighting assembly (4) in turn comprising a platelike light-guide body (5), which is made of photoconductive material and extends within the rear casing (2) in such a way as to arrange a front sidewall (6) thereof facing the transparent or semitransparent portion (3a) of the front half-shell (3), and a rear sidewall (7) thereof facing the bottom of the rear casing (2); and a light-emitting device (8), which is located inside the rear casing (2) and is structured so as to direct the light produced within the platelike light-guide body (5), in such a way that said light can propagate inside the platelike light-guide body (5) via internal total reflection up to reach, and exit from, the front sidewall (6);

the automotive light (1) being characterized in that the rear sidewall (7) of the platelike light-guide body (5) has a curved profile having a substantially parabolic shape, with the concavity facing the front sidewall (6), and is provided with a transverse slot (9), which extends within the platelike light-guide body (5), from the rear sidewall (7) to the front sidewall (6), remaining substantially perpendicular to the midplane of the platelike light-guide body (5) and substantially parallel to an optical axis (A) of the automotive light in such a way as to divide the rear sidewall (7) into two semiparabolic portions (7a, 7b; 7c, 7d, 7e), each of which follows a specific curved profile with complex parabolic geometry; in that the light-emitting device (8) engages said transverse slot (9) and is provided with two light sources (10), which are positioned within the transverse slot (9), each directly facing a respective inner sidewall (11) of the platelike light-guide body (5) in such a way as to direct the light produced within the platelike light-guide body (5) towards a corresponding semiparabolic portion (7a, 7b; 7c, 7d, 7e) of the rear sidewall (7); and in that at least one of the two semiparabolic portions (7a, 7b; 7c, 7d, 7e) of the rear sidewall (7) is shaped in such a way as to direct the light rays coming from the light source (10) towards the front sidewall (6) in such a way that the light rays exiting from the front sidewall (6) are collimated in a first direction ($d_1$) substantially parallel to said optical axis (A) of the automotive light, and also at least in a second direction ($d_2$, $d_3$) inclined with respect to the optical axis (A) of the automotive light by a first pre-set angle.

2. The automotive light according to claim 1, characterized in that said semiparabolic portion (7a, 7b; 7c, 7d, 7e) of the rear sidewall (7) comprises, in succession and starting from the transverse slot (9): a first curved portion (7a, 7c) with parabolic geometry, which is shaped in such a way as to reflect the light rays ($r_a$, $r_c$) coming from the facing light source (10) towards the front sidewall (6) of the platelike light-guide body (5) with an angle of incidence such that said light rays ($r_a$, $r_c$) exit from the front sidewall (6) collimated substantially parallel to said first direction ($d_1$); and also at least one second curved portion (7b, 7d) with parabolic geometry, which is shaped in such a way as to reflect the light rays ($r_b$, $r_d$) coming from the facing light source (10) towards the front sidewall (6) of the platelike light-guide body (5) with an angle of incidence such that said light rays ($r_b$, $r_d$) exit from the front sidewall (6) collimated substantially parallel to said second direction ($d_2$, $d_3$).

3. The automotive light according to claim 1, characterized in that said semiparabolic portion (7a, 7b; 7c, 7d, 7e) of the rear sidewall (7) is shaped in such a way as to direct the light rays coming from the light source (10) towards the front sidewall (6) in such a way that the light rays exiting from the front sidewall (6) are collimated also in a third direction ($d_4$) inclined by a second pre-set angle with respect to the optical axis (A) of the automotive light.

4. The automotive light according to claim 3, characterized in that said semiparabolic portion (7a, 7b; 7c, 7d, 7e) of the rear sidewall (7) also comprises a third curved portion (7e) with parabolic geometry, which is shaped in such a way as to reflect the light rays ($r_e$) coming from the facing light source (10) towards the front sidewall (6) of the platelike light-guide body (5) with an angle of incidence such that said light rays ($r_e$) exit from the front sidewall (6) collimated substantially parallel to said third direction ($d_4$).

5. The automotive light according to claim 3, characterized in that said third direction ($d_4$) is inclined with respect to the optical axis (A) of the automotive light by an angle of between 40° and 50°.

6. The automotive light according to claim 1, characterized in that said transverse slot (9) is located basically at the center of said rear sidewall (7).

7. The automotive light according to claim 1, characterized in that the two light sources (10) of the light-emitting device (8) are located astride of the midplane of the platelike light-guide body (5).

8. The automotive light according to claim 1, characterized in that the two inner sidewalls (11) of the platelike light-guide body (5) that delimit and flank the transverse slot (9) are substantially parallel to said optical axis (A) of the automotive light.

9. The automotive light according to claim 1, characterized in that the front sidewall (6) of the platelike light-guide body (5) is structured in such a way as to scatter the light rays ($r_a$, $r_b$, $r_c$, $r_d$, $r_e$) exiting from the platelike light-guide body (5).

10. The automotive light according to claim 9, characterized in that the platelike light-guide body (5) has, at the front sidewall (6), a platelike head (12) that extends in cantilever fashion in a direction perpendicular to the midplane of the platelike light-guide body (5), in such a way as to be substantially perpendicular to the optical axis (A) of the automotive light and preferably also locally substantially parallel to the transparent or semitransparent portion (3a) of the front half-shell (3), and is structured in such a way as to scatter the light rays ($r_a$, $r_b$, $r_c$, $r_d$, $r_e$) exiting from the front sidewall (6).

11. The automotive light according to claim 1, characterized in that at least one of the two light sources (10) of the light-emitting device (8) comprises a LED or OLED.

12. The automotive light according to claim 1, characterized in that the light-emitting device (8) has a substantially platelike structure, and extends into the transverse slot (9), remaining substantially perpendicular to the midplane of the platelike light-guide body (5) and locally substantially parallel to said optical axis (A) of the automotive light.

13. The automotive light according to claim 12, characterized in that the light-emitting device (8) comprises: a support board (15), which extends in a direction perpendicular to the midplane of the platelike light-guide body (5) and engages the transverse slot (9); and two LEDs or OLEDs (10) positioned on the two major faces of the support board (15), each facing a respective inner sidewall (11) of the platelike light-guide body (5).

14. The automotive light according to claim 13, characterized in that the two LEDs or OLEDs (10) are placed on the support board (15) in such a way as to be arranged astride of the midplane of the platelike light-guide body (5), and are staggered with respect to one another parallel to the midplane of the platelike light-guide body (5).

15. The automotive light according to claim 1, characterized in that the front sidewall (6) of the platelike light-guide body (5) is substantially perpendicular to said optical axis (A) of the automotive light.

16. The automotive light according to claim 1, characterized in that said second direction ($d_2$, $d_3$) is inclined with respect to the optical axis (A) of the automotive light by an angle of between 20° and 40°.

17. The automotive light according to claim 1, characterized in that the optical axis (A) of the automotive light is substantially parallel to the longitudinal axis of the vehicle when the automotive light is mounted on the vehicle body.

* * * * *

UNITED STATES PATENT AND TRADEMARK OFFICE
CERTIFICATE OF CORRECTION

PATENT NO. : 9,994,143 B2
APPLICATION NO. : 15/137230
DATED : June 12, 2018
INVENTOR(S) : Domenico Ferigo and Sara Paroni Page 1 of 1

It is certified that error appears in the above-identified patent and that said Letters Patent is hereby corrected as shown below:

On the Title Page

Item (54) the title "Automotive Lighting" be changed to "Automotive Light."

Signed and Sealed this
Eleventh Day of September, 2018

Andrei Iancu
*Director of the United States Patent and Trademark Office*